US006348917B1

(12) United States Patent
Vaswani

(10) Patent No.: US 6,348,917 B1
(45) Date of Patent: *Feb. 19, 2002

(54) DYNAMIC SWITCHING OF TEXTURE MIP-MAPS BASED ON DEPTH

(75) Inventor: Gautam Vaswani, Austin, TX (US)

(73) Assignee: Cirrus Logic, INC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/720,395

(22) Filed: Sep. 30, 1996

(51) Int. Cl.[7] .............................................. G06T 17/00
(52) U.S. Cl. ...................................... 345/418; 345/582
(58) Field of Search ................................ 345/418, 430, 345/419, 519, 582

(56) References Cited

U.S. PATENT DOCUMENTS

| | | | |
|---|---|---|---|
| 4,583,185 A | 4/1986 | Heartz | 364/521 |
| 4,586,038 A | 4/1986 | Sims et al. | 340/729 |
| 4,692,880 A | 9/1987 | Merz et al. | 364/521 |
| 4,714,428 A | 12/1987 | Bunker et al. | 434/43 |
| 4,715,005 A | 12/1987 | Heartz | 364/521 |
| 4,727,365 A | 2/1988 | Bunker et al. | 340/728 |
| 4,811,245 A | 3/1989 | Bunker et al. | 364/521 |
| 4,821,212 A | 4/1989 | Heartz | 364/521 |
| 4,825,391 A | 4/1989 | Merz | 364/526 |
| 4,855,937 A | 8/1989 | Heartz | 364/521 |
| 4,862,388 A | 8/1989 | Bunker | 364/521 |
| 4,868,771 A | 9/1989 | Lee et al. | 364/578 |
| 4,905,164 A | 2/1990 | Chandler et al. | 364/518 |
| 4,958,305 A | 9/1990 | Piazza | 364/522 |
| 4,965,745 A | 10/1990 | Economy et al. | 364/518 |
| 4,974,176 A | 11/1990 | Buchner et al. | 364/522 |
| 5,126,726 A | 6/1992 | Howard et al. | 340/728 |
| 5,187,754 A | 2/1993 | Currin et al. | 382/54 |
| 5,191,642 A | 3/1993 | Quick et al. | 395/127 |
| 5,268,996 A | 12/1993 | Steiner et al. | 395/126 |
| 5,293,467 A | 3/1994 | Buchner et al. | 395/122 |
| 5,357,579 A | 10/1994 | Buchner et al. | 382/1 |
| 5,367,615 A | 11/1994 | Economy et al. | 395/129 |
| 5,420,970 A | 5/1995 | Steiner et al. | 395/133 |
| 5,550,960 A | * 8/1996 | Shirman et al. | 345/430 |
| 5,606,650 A | * 2/1997 | Kelly et al. | 345/430 |
| 5,706,481 A | * 1/1998 | Hannah et al. | 345/519 |
| 5,771,046 A | * 6/1998 | Izawa et al. | 345/427 |
| 5,831,624 A | * 11/1998 | Tarolli et al. | 345/430 |
| 5,973,701 A | * 10/1999 | Vaswani | 345/430 |

FOREIGN PATENT DOCUMENTS

WO          9636011          11/1996

OTHER PUBLICATIONS

Williams, Pyramidal Parametrics Computer Graphics, vol. 17, No. 3, Jul. 1983.*
Crow, Summed Area Tables for Texture Mapping Computer Graphics, vol. 18, No. 3, pp. 207–211, Jul. 1984.*

* cited by examiner

Primary Examiner—Mark Zimmerman
Assistant Examiner—Huedung X. Cao
(74) Attorney, Agent, or Firm—Robert P. Bell; Steven Lin

(57) ABSTRACT

A graphics subsystem includes hardware and/or software for permitting mip-maps to be dynamically switched based upon depth (Z) values. In addition, the system generates a SHIFT signal to permit automatic adjustment of texture parameters to facilitate retrieval of texture maps. The system includes a mip-map select logic or routine that compares the depth value of a pixel to be rendered with predetermined depth values. The depth values may be stored in a plurality of depth registers, and compared with the depth value of a pixel in a plurality of associated comparators. A mip-map is selected based upon the comparisons, and the SHIFT signal is generated to indicate the order of change with respect to a base reference mip-map. A texture engine receives the SHIFT signal and uses the associated base address of the selected mip-map and shifted texture parameters to define an address for the texture map.

22 Claims, 7 Drawing Sheets

DYNAMIC SWITCHING OF TEXTURE MIP-MAPS BASED ON DEPTH

FIELD OF THE INVENTION

The present invention relates generally to a graphics subsystem for a personal computer. More particularly, the present invention relates to a method and apparatus for manipulating the size of an image during three dimensional interpolated polygon rendering. Still more particularly, the present invention relates to a technique for dynamically switching mip-maps during polygon rendering based upon the depth parameter of each pixel to be drawn.

BACKGROUND OF THE INVENTION

Before the availability of the personal computer (PC), computer graphics packages were expensive tools primarily reserved for industrial applications. Early microcomputers were only capable of rendering simple line drawings with a low screen resolution (256×256, for example). As microcomputers evolved, higher resolution color displays became available, and software applications routinely provided data output in a graphical manner. The graphics techniques used were unstructured, with objects defined in terms of absolute coordinates using straight lines. Subsequently, graphics "primitives" were used, enabling circles, ellipses, rectangles and polygons to be drawn with a single instruction. The use of primitives that can be rendered with a single instruction set of parameters has increased the speed at which the images can be rendered.

The availability of computer graphics has generated a demand for higher resolutions and three dimensional (3-D) rendering capabilities. Computer animation and games, in particular, have spawned a revolution in computer graphics capabilities. A 3-D image can be represented in a computer system as a collection of graphical objects, such as polygons, lines, and points. A set of vertex points defines a polygon. Associated with each point are certain pixel values, such as shading, texturing, color, and the like. Identification of other points within the polygon typically is done through the use of linear interpolation. Once interpolated, the polygon can be rendered on a computer monitor by successive scanning of orthogonal rows of the polygon.

Performing the linear interpolation calculations for each point (or pixel) of the polygon is very processor intensive. To minimize computations, polygon rendering typically is performed using a forward (or main) slope technique. Referring to the example of FIG. 6, a polygon 40 is divided into two adjacent triangles 47 and 49. The main slope technique requires the calculation of a main slope value (Δ main) which defines the slope of the side 45 that extends the entire vertical length of the triangle 40. Two opposite slopes are determined which represent the slopes of the other two sides 51, 53 of the triangle. A width slope value (Δ width) is calculated to define the incremental change in width for each successive orthogonal scan line (or row) of the polygon. An initial width value is provided for each triangle 47, 49 to represent the width of the first orthogonal scan for that triangle. Polygon 40 may also include depth values (or z values). An initial x and y value $(x_1, y_1)$ defines the location of the initial vertex for the polygon, while the z value $(z_1)$ defines the depth. The z value is used to determine whether the image being rendered is in front of or behind other images, and thus determines whether the image will appear on the display, or whether it will be "hidden" behind another object. Other initial and slope values also may be generated to render the polygon, such as initial values for red, blue and green initial, and main and ortho slope values defining incremental variations in each color in both the x and y directions. Each of the triangles 47, 49 also has an associated count value to represent the number of scan lines required to render each triangle. In the preferred embodiment, the count value is determined by the y coordinate values of the vertex points. Thus, the upper count (COUNT 0) is found by subtracting $y_2$ from $y_1$. Similarly, the lower count value is determined by subtracting $y_3$ from $y_2$.

Each of the various initial and slope values typically are defined by a software graphics application driver, running on the host processor. Thus, the software driver, through the vehicle of the host processor, generates a "display list" of parameters that are written to the graphics controller or processor. These parameters include, for example, the initial and slope values identified above. The graphics controller then uses the display list values in generating the graphics to be displayed.

In addition to the basic position and color parameters, graphics controllers are available which permit the texture of the polygon to be represented as part of the display. A texture may be defined as an image of a pattern generated by the software driver. Graphics controllers perform texture mapping by taking the pattern, which represents a flat image, and mapping the pattern in a curved or contoured manner. Thus, for example, the graphics application may require a particular pattern mapped to a teapot, or some other three dimensional object. In that case, the flat pattern image would be mapped to the teapot to represent the curved surface of the teapot, thus giving the illusion that the teapot is a three dimensional object.

When rendering in a three dimensional (3D) graphics application, such as a 3D animation application, a difficulty arises because the object moves. If the animation depicts relative movement of the object with respect to the viewer, (i.e. a person walking past a statue in a courtyard), then the distance between the object (the statue) and the viewer changes. To represent this change in distance, the object is rendered larger or smaller to reflect the viewer moving closer or further from it. To accomplish this type of rendering in 3D animation, different size versions of the object are generated, and a particular size version of the object is selected based upon the distance between the viewer and the object. The various size versions of the object are generated by the software driver by either compressing or expanding the image. Because resolution is lost when converting from a smaller to a larger image, the graphics application typically uses the largest possible image as the base image, so that smaller versions may be made by compressing the base image. Compression of the texture map is done through the use of filtering and averaging algorithms to compress the image. Thus, if the initial image was 512 bytes by 512 bytes (512×512), the map could be compressed to 256×256, 128×128, 64×64, or 32×32 or 16×16, for example, giving six different size images for the same object. Compression of each image is performed by taking a grouping of four pixels and averaging the pixel values to obtain a single pixel value. Each of the different size versions of the image are referred to as "Mip-maps."

In certain instances, several Mip-maps may be used to generate a polygon to provide a desired spatial relationship. Thus, for example, if the polygon being rendered is a brick wall that extends into the distance, it may be desirable to use different Mip-maps for different sections of the wall to make the bricks appear smaller for each section extending in the distance. Thus, initially, a first Mip-map of 256×256 may be used to render the first section of the wall. The section of the wall that is further away may then be rendered using a second Mip-map of 128×128. Proceeding further down the wall, it may be desirable to use a third Mip-map of 64×64. Thus, for objects that extend into the distance, it may be desirable to use different Mip-maps for patterns to add a sense of realism to the graphics display.

For most implementations of Mip-maps, the image is partitioned based upon the mip-maps and each mip-map partitions independently drawn. In addition, a separate set of interpolators and comparators are provided that track the location of the pixel being generated, and switch between Mip-maps based upon pixel location. The use of interpolators and comparators increases the number of gates required to implement the hardware and/or increases the number of clock cycles required to execute the software application. Thus, the interpolators required to switch between Mip-maps add to the overhead involved in generating the graphics display. It would be advantageous if mip-maps could be switched without the necessity of an inordinate number of additional gates.

In addition, it would be advantageous if the polygon could be rendered without breaking it into smaller polygons corresponding to the different Mip-maps. Partitioning the polygon into multiple sections and rendering these sections individually greatly increases the amount of time required to render the object. Instead, it would be advantageous if the object could be rendered with a single instruction by dynamically switching from one Mip-map to another without dissecting the object.

SUMMARY OF THE INVENTION

The present invention provides a system for dynamically switching Mip-maps for 3D polygon rendering without requiring the polygon to be dissected into Mip-map blocks. In accordance with the preferred embodiment, the present invention monitors the depth value (z) and selects the appropriate Mip-map based upon the measured depth value. Preferably, a graphics processor couples to the system bus for receiving a display list from the host processor providing parameters on the primitive to be drawn. Based upon the depth value (z) of the pixel to be rendered, the graphics processor dynamically selects a Mip-map to use in rendering the pixel, thus permitting multiple mip-maps to be used with single instruction rendering of the polygon.

The graphics processor preferably includes a register file for storing the display list parameters for a primitive, and a 3D engine which receives the display list parameters and generates values to enable rendering of the polygon. The 3D engine preferably includes an interpolation engine to generate x, y, z, r, g, b, u, and v values for each pixel from the initial and slope values provided in the display list. The z value is provided as an input to a Mip-map select logic, to select the Mip-map to be used to render that particular pixel. In the preferred embodiment, the Mip-map select logic includes a plurality of registers which are loaded with predetermined depth values. The depth registers define depth ranges for each of the Mip-maps. The z value for the pixel to be rendered is compared to the depth values in the depth registers in an associated comparator. A select logic selects the Mip-map based upon the results of the comparisons and provides a SHIFT output signal indicating the Mip-map selected, and the order of change from a base mip-map image.

In the preferred embodiment a texture engine receives the SHIFT signal and generates a texture map based upon the SHIFT value provided by the select logic. In addition to selecting the Mip-map, the SHIFT signal also is used to modify texture parameters to enable quick retrieval of the appropriate texture map for the selected mip map. The texture engine generates modified texture values u' and v', based upon the initial u and v values generated by the interpolation engines. The modified values u', v' values a number of bits defined by the contents of the SHIFT signal. The appropriate texture map is read from memory using the address of the base mip-map selected, and the modified texture parameters.

The present invention can be implemented either in hardware or in software. Thus, the graphics controller may be configured as a software algorithm which operates in the host processor or in some other system processor. In this embodiment, the software algorithm selects a Mip-map based upon comparing predefined depth ranges for the Mip-maps with the depth value z for each pixel. In addition, the initial u and v values (and texture width values) are manipulated based upon a calculated shift value to obtain new texture values u' and v' (and w') that then are used to read a texture map.

Further advantages and features of the present invention will become apparent upon reading the detailed description which follows.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
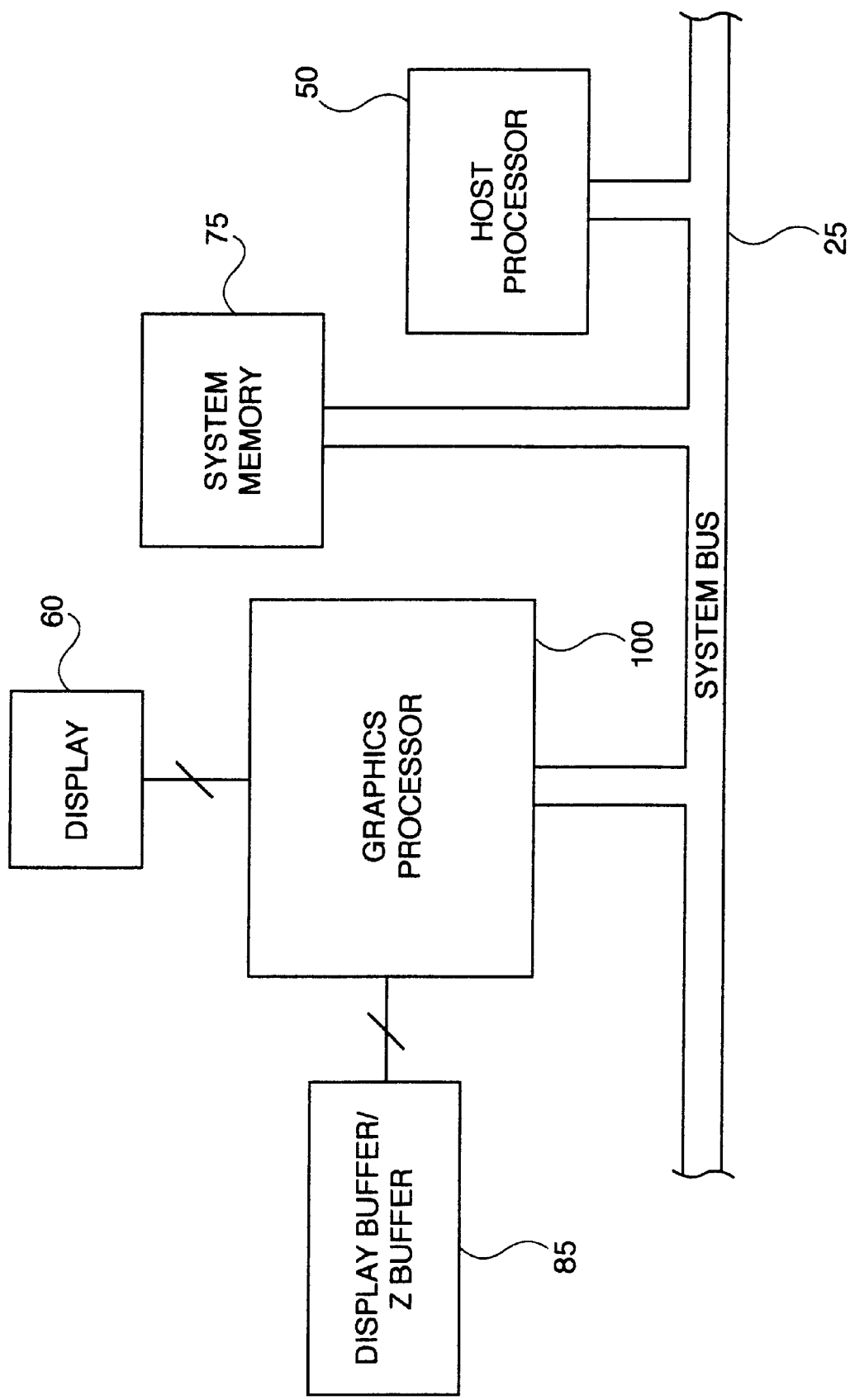
FIG. 1 is a simplified block diagram of a graphics processor connected to a system bus of a computer system, in accordance with the principles of the present invention.

Referring now to FIG. 1, the present invention relates generally to a graphics subsystem for a personal computer (PC) capable of rendering polygons preferably using a main slope technique. As shown in FIG. 1, the graphics system generally includes a host processor 50 and system memory 75 coupled to a system bus 25, a graphics processor 100, a display buffer/Z buffer 85, and a display unit 60. The host processor 50 may comprise the central processing unit of a PC, while system memory 75 may comprise the working memory, or random access memory array of the PC. The host processor 50 preferably includes a software driver that provides instructions (or "opcode") to the graphics processor 100 to indicate the type of operation to be performed. The instructions indicate whether the graphics processor is to perform a rendering operation, institute a read/write cycle, branch to a particular address, or perform a control operation, for example. With respect to rendering operations, the instructions also preferably identify the type of primitive to be rendered.

In addition to generating instructions, the software driver also generates display parameters, which define display objects to be rendered by the graphics processor 100. Thus, for example, the software driver may identify the spatial location of points, line endpoints, or vertex coordinates of polygons. For polygons, the software driver also preferably identifies main slope and width slope values for the polygon. When applicable, the software driver also identifies color intensity values and slopes, texture values and slopes, and various other parameter values as will be understood by one skilled in the art. Thus, the software driver calculates and loads main and orthogonal slopes, start and stop values for pixel position, intensity, depth and transparency of objects to be rendered by the graphics processor 100. The software driver preferably is loaded into the system memory 75 from a permanent magnetic storage device, such as a hard drive or CD ROM drive device (not specifically shown). Once loaded, the software driver is executed by the host processor 50.

It should be understood that the particular configuration shown in FIG. 1 is only one of many possible implementations of a graphics subsystem for use in a personal computer system. FIG. 1 is simplified for purposes of clarity so that many components and control signals are omitted which are not required for an understanding of the present invention. In the preferred embodiment, the graphics processor 100 provides hardware support for 2D and 3D graphics, and for text and windowing operations of a computer system. The graphics processor 100 transfers digital data from the system memory 75 or host processor 50, and processes data for storage in the display buffer/Z buffer 85 for ultimate display on the display device 60.

In accordance with the preferred embodiment, the host processor 50 provides parameter values and other instructions in the form of a display list, which typically is stored in system memory 75 until required by the graphics processor 100. Alternatively, the host processor 50 may directly write the display list to the graphics processor 100 in accordance with known techniques. The host processor 50 and system memory 75 both preferably communicate with the graphics processor 100 via the system bus 25. The system bus 25 may comprise any one of a plurality of different types of host or input/output (I/O) buses, including the industry standard architecture (ISA), the extended ISA (EISA), the peripheral component interconnect (PCI), the video electronic standard association (VESA) local bus or any other standardized system bus of a computer system. If the graphics processor 100 is integrated as part of the host processor 50, then bus 25 may comprise a CPU local bus.

Referring still to FIG. 1, the graphics processor 100 preferably couples to the system bus 25. In accordance with the preferred embodiment, the graphics processor 100 preferably includes bus mastering capabilities, thus permitting graphics processor 100 to obtain mastership of the system bus 25. Once mastership of the system bus 25 is obtained, the graphics processor 100 may initiate a read cycle to system memory 75 to read the display list, instead of waiting until the host processor performs a write operation to the graphics processor 100. As shown in FIG. 1, graphics controller 100 also connects to a display unit 60 and to display buffer/Z buffer 85 (also commonly referred to as a frame buffer). In the preferred embodiment, the display buffer 85 comprises a bank of RDRAM buffers, where the digital data stored in the RDRAM comprises a rectangular array of picture elements referred to as pixels or pixel values. The RDRAM buffer 85 provides a performance improvement by permitting faster access to display list instructions and pixel data, compared to accessing data stored in the main memory 75 of the host computer system. The graphics processor 100 communicates to the RDRAM buffer 85 through address data and control lines, collectively referred to as an RBUS 118. The display unit 60 may be any suitable type of display device, such as a cathode ray tube (CRT) for desktop, workstation or server applications, a liquid crystal display (LCD), a thin film transistor (TFT) display, or any other suitable display device for a personal computer. The graphics processor 100 provides pixel values to display unit 60 for displaying graphical data on a screen-by-screen basis.

Figure 2:
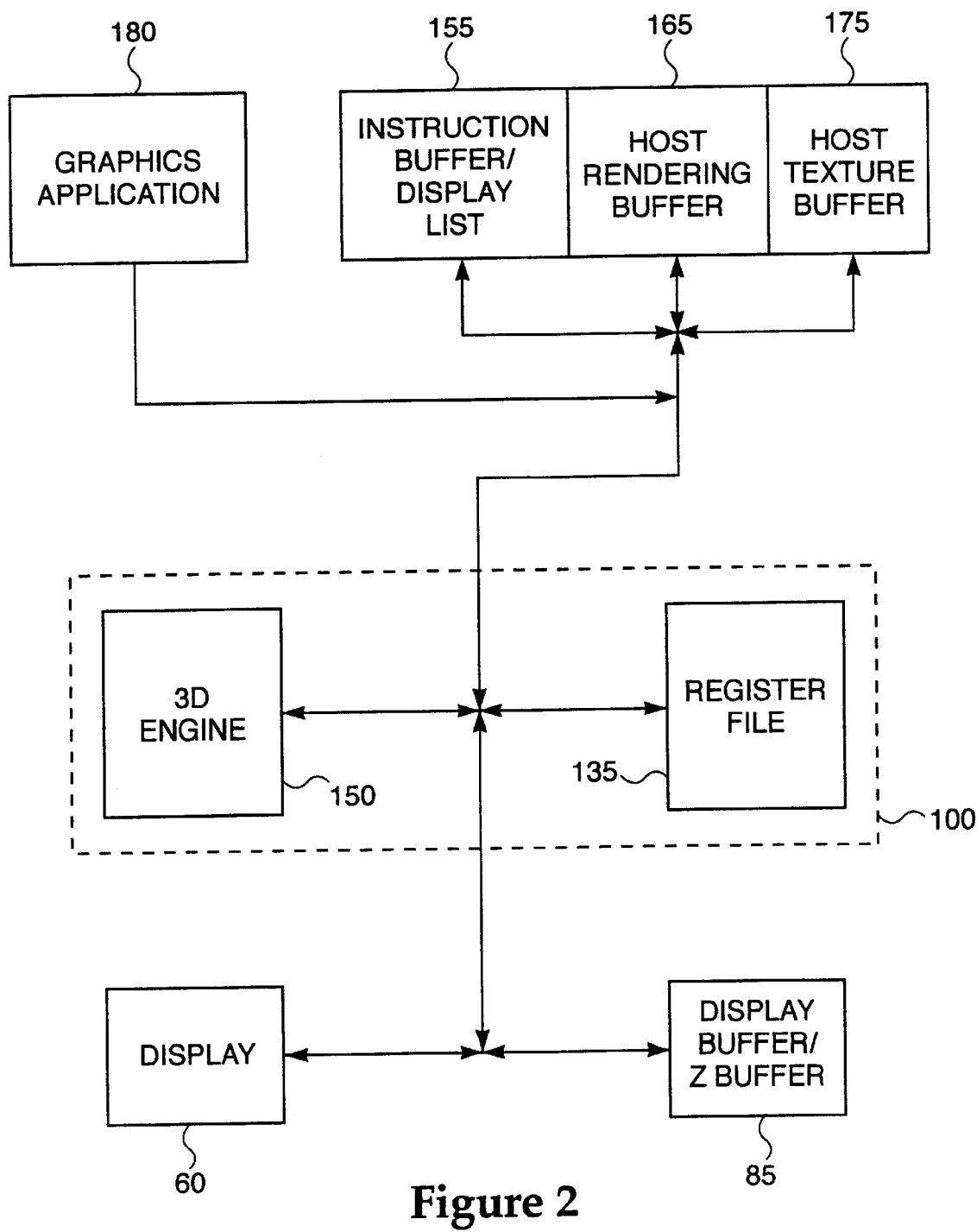
FIG. 2 is a block diagram showing in more detail the graphics processor of FIG. 1.

Referring now to FIG. 2, the graphics processor 100 constructed in accordance with the preferred embodiment includes a register file 135 and a 3D engine 150 for generating three dimensional primitives. The host system is represented in FIG. 2 as including an instruction buffer 155, a host rendering buffer 165 and a host texture buffer 175. Buffers 155, 165, 175 store the instructions and parameters generated by the graphics application 180. As one skilled in the art will understand, buffers 155, 165, 175 may reside either in the processor 50 or system memory 75 of FIG. 1. The instruction buffer 155 stores the operational instructions and the display list to define the operation of graphics processor 100 and the parameters used to render the primitive.

A representative example of a display list is shown below in Table I for purposes of illustration.

TABLE I

| ADDRESS | NAME | DESCRIPTION |
| --- | --- | --- |
| 0x4000 | X | Initial X value |
| 0x4004 | Y | Initial Y value |
| 0x4008 | R | Initial Red value |
| 0x400C | G | Initial Green value |
| 0x4010 | B | Initial Blue value |
| 0x4014 | Δ MAIN | Main Slope value |
| 0x4018 | Y COUNT | Top count: Bottom count concatenated |
| 0x401C | WIDTH MAIN | Initial top width value |
| 0x4020 | WIDTH OPP | Initial bottom width value |
| 0x4024 | Δ WIDTH MAIN | Top width slope |
| 0x4028 | Δ WIDTH OPP | Bottom width slope |
| 0x402C | ΔR MAIN | Red Main Slope |
| 0x4030 | ΔG MAIN | Green Main Slope |
| 0x4034 | ΔB MAIN | Blue Main Slope |
| 0x4038 | ΔR ORTHO | Red Ortho Slope |
| 0x403C | ΔG ORTHO | Green Ortho Slope |
| 0x4040 | ΔB ORTHO | Blue Ortho Slope |
| 0x4044 | Z | Initial Z value |
| 0x4048 | ΔZ MAIN | Z Main Slope value |
| 0x404C | ΔZ ORTHO | Z Ortho value |
| 0x4050 - 0x407C | Other | Other values for U and V |
| 0x40C0 - 0x40C8 | Other | Other values for Alpha |
| 0x40FC | OPCODE | Opcode for Execution/Poly Engine |

As will be understood by one skilled in the art, the register file provides the parameters to the 3D engine 150 that are necessary to render a particular polygon. As one skilled in the art will understand, not all display list parameters are required for every polygon. Thus, if a polygon has no texture mapping, then the values for u and u are either ignored or a zero value is used.

The host rendering buffer 165 stores the results of calculations performed by the graphic application, including 3D rendering parameters. The host texture buffer 175 stores the texture values provided by the graphics application. The graphics application 180 represents the software components and modules used to perform graphics type work on the PC.

Referring still to FIG. 2, the graphics processor 100 preferably includes a register file 135 and a 3D graphics engine 150. Other logic may also be provided as part of the graphics processor, but are left out here so as not to obfuscate the present invention. It should also be understood that while FIG. 2 depicts a hardware implementation of the graphics processor 100, the functional capabilities of the graphics engine may be implemented in software and could reside in the host processor 50, or in some other system processor. Thus, the present invention is not intended to be restricted to a hardware implementation, and one skilled in the art will understand that the principles disclosed herein may be implemented in software. As processor speeds continue to increase, and as microprocessors evolve to include multimedia capabilities, the implementation of the graphics subsystem may reside in the system central processing unit (CPU). The graphics engine of the present invention is capable of functionally residing in either a dedicated graphics processor, as shown in FIGS. 1 and 2, or in a software implementation that is executed by the host processor of FIG. 1.

Figure 3:
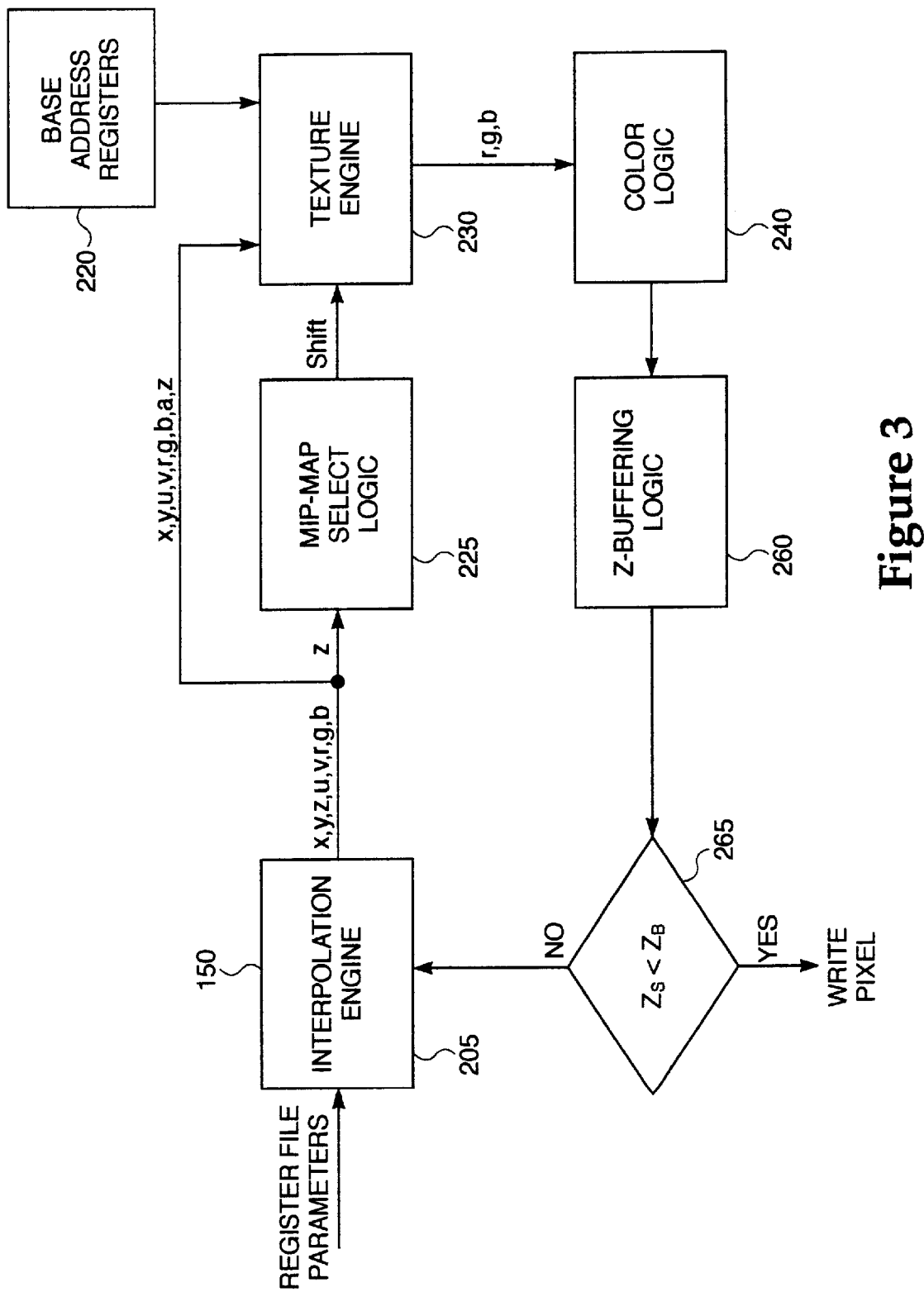
FIG. 3 is a block diagram depicting portions of the 3D engine of FIG. 2.

The register file 135 receives the instructions and display list from buffer 155 for subsequent use by the 3D engine 150. The 3D engine 150 receives the instructions and display parameters from the register file 135 and generates values for each pixel for rendering on display 60. Referring now to FIG. 3, the 3D engine 150 is shown in more detail in accordance with the preferred embodiment of the present invention. As shown in FIG. 3, the 3D engine 150 constructed in accordance with the preferred embodiment includes an interpolation engine 205, Mip-map select logic 225, texture engine 230, color logic 240, Z buffering logic 260 and Z comparator 265. As will be discussed in more detail below in relation to FIG. 5, the 3D engine may be implemented in software with routines providing the same functional capabilities as the hardware implementation depicted in FIG. 3.

Referring now to FIGS. 2 and 3, in the preferred embodiment the interpolation engine 205 receives the primitive parameters from register file 135, including the initial and slope values for the various parameters provided in the display list. From these values, the interpolation engine 205 generates parameter values for each pixel to be drawn. Some of the parameter values generated by interpolation engine 205 include x, y, z, r, g, b, u, and v values. The x and y values indicate the position of the pixel in the display buffer 85, while the z value indicates depth. The u and v values represent texture values and r, g, b represent color intensity values for red, green and blue, respectively. As shown in FIG. 3, the parameter values are provided to the texture engine 230. In addition, the z value output from interpolation engine 205 also is provided to the Mip-map select logic 225.

Figure 4:
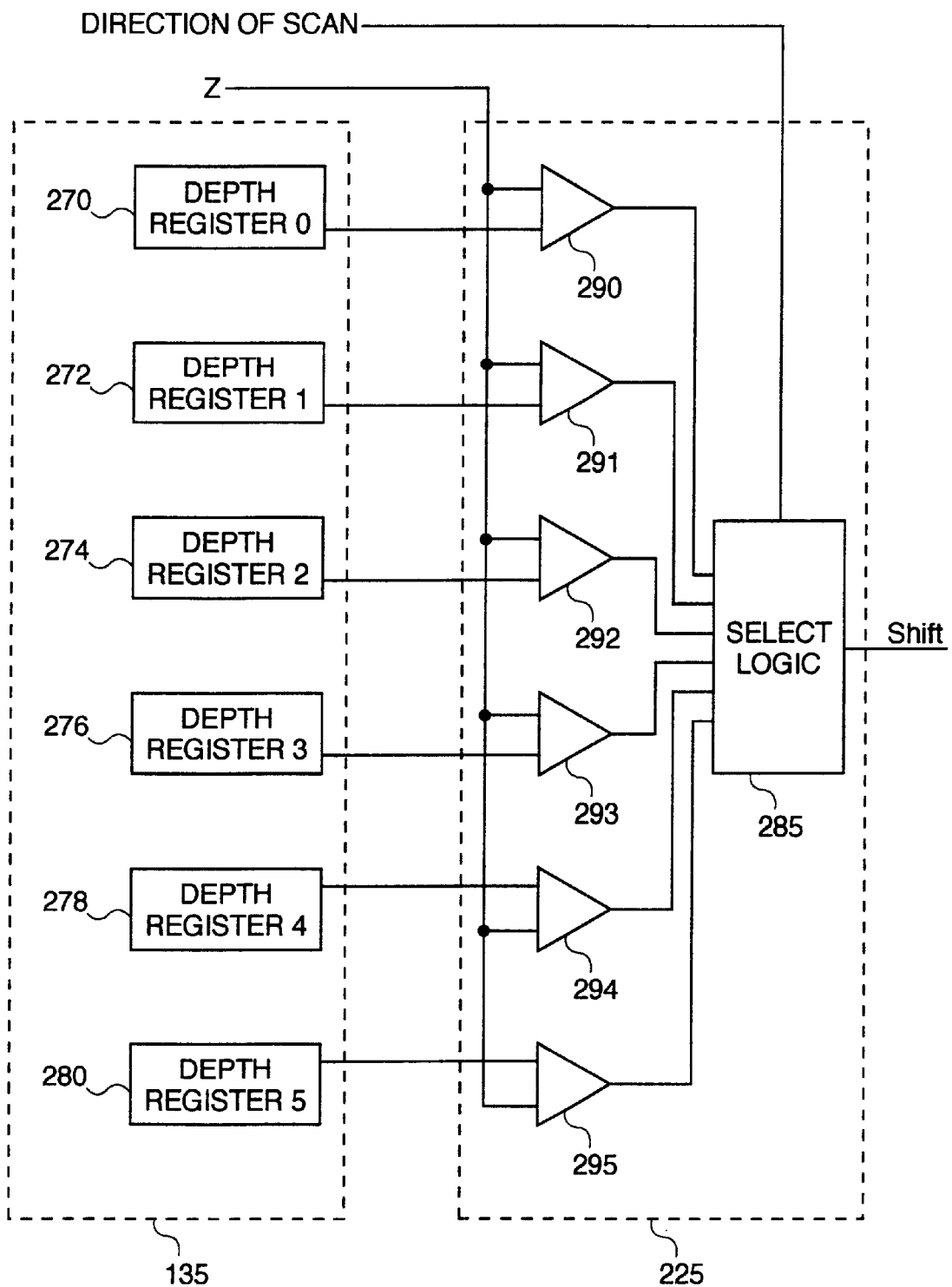
FIG. 4 schematically depicts the Mip-map select logic of FIG. 3.

For each pixel to be rendered, the Mip-map select logic 225 determines which Mip-map to use in rendering that pixel. Referring now to FIGS. 3 and 4, the register file 135 preferably includes a plurality of depth registers 270, 272, 274, 276, 278, 280 representing the available Mip-maps for rendering the image. Values for the depth registers preferably are provided as part of the graphics application. The Mip-maps may be associated with the depth registers in a variety of ways that will be apparent to one skilled in the art. Thus, for example, if eight Mip-maps are available for rendering an image, six depth registers $DR_0$, $DR_1$, $DR_2$, $DR_3$, $DR_4$, and $DR_5$ may be provided to define the depth ranges for each of the Mip-maps, as shown in Table II.

TABLE II

| REGISTER RANGE | MIP-MAP SELECTED |
| --- | --- |
| less than register 0 | Mip-map # 1 (1024 x 1024) |
| register 0 – register 1 | Mip-map # 2 (512 x 512) |
| register 1 – register 2 | Mip-map # 3 (256 x 256) |
| register 2 – register 3 | Mip-map # 4 (128 x 128) |
| register 3 – register 4 | Mip-map # 5 (64 x 64) |
| register 4 – register 5 | Mip-map # 6 (32 x 32) |
| register 5 – register 6 | Mip-map # 7 (16 x 16) |
| greater than register 6 | Mip-map # 8 (8 x 8) |

In this implementation an increasing z value represents greater depth. The logic could be inverted if a decreasing z value represented greater depth. One skilled in the art will understand that fewer or more registers may be provided as desired, or that different associations between the registers and mip-maps may be used if desired. Thus, for example, each Mip-map may be associated with a specific depth register, instead of associating the Mip-map with a range between each register, as shown in the following example for a six Mip-map embodiment:

TABLE III

| DEPTH REGISTER | MIP-MAP SELECTED |
| --- | --- |
| Depth register 0 | Mip-map # 1 |
| Depth register 1 | Mip-map # 2 |
| Depth register 2 | Mip-map # 3 |
| Depth register 3 | Mip-map # 4 |
| Depth register 4 | Mip-map # 5 |
| Depth register 5 | Mip-map # 6 |

As shown in FIG. 4 and Table II, the Mip-map select logic 225 preferably includes a plurality of comparators 290, 291, 292, 293, 294, 295 associated with each depth register ($DR_x$) for comparing the depth value in the register with the actual z value of the pixel to be rendered to determine if the z value is above or below each register value. Based upon the results of the comparison, select logic 285 determines which Mip-map to select, as indicated by the SHIFT output from the select logic 285. Thus for example, if the z value is 55, and the register values are 25, 50, 75, 100, 150, and 250, comparators 290, 291 will generate a binary value (such as a "1" value) indicating that the actual z value is higher than the associated register value. Conversely, comparators 292, 293, 294, 295 will generate a binary value (such as "0" value) indicating that the actual z value is lower than the associated register value. The select logic 285 detects the register value at which the binary output values of the comparators change, and from that, determines the appropriate range for the actual depth (z) value. As one skilled in the art will understand, if there is no change of state in the comparators, then the minimum or maximum Mip-map is selected, based upon direction of the scan, the output of the comparators and whether the comparators are checking for a greater than or less than condition.

As an alternative and as shown in Table III, each depth register 270, 272, 274, 276, 278, 280 can be used to define a Mip-map, instead of using the range between register values. In this embodiment, the direction of the scan is provided to the select logic 285 to determine whether the select logic checks for a greater than or less than condition. If checking for a greater than condition, select logic 285 scans the registers in increasing order of magnitude and selects the Mip-map associated with the depth register with the first change of state. If no change of state is detected, the first Mip-map is selected. Conversely, if checking for a less than condition, select logic 285 scans the depth registers in decreasing order of magnitude and selects the Mip-map associated with the depth register with the first change of state.

Referring still to FIGS. 3 and 4, the select logic 285 preferably provides a SHIFT output signal, identifying the Mip-map selected. In the preferred embodiment, the SHIFT signal includes a numerical value in binary code representing the order of change from a fixed base reference Mip-Map. Thus, if Mip-map #1 was chosen as the base reference, the SHIFT signal would indicate the Mip-map selected by providing a signal indicating the order of the change from map #1. A SHIFT signal indicating a value of three (a 011 in binary code), would indicate Mip-map #4 was selected. By using a base reference Mip-map, the texture values (u, v) for that Mip-map can be used as base texture values, to facilitate manipulation of the texture values by the texture engine according to the value of the SHIFT signal, as will be described more fully below. The number of bits required for the SHIFT signal varies depending upon the number of Mip-maps available for selection, as will be apparent to one skilled in the art.

Alternatively, the SHIFT signal could be configured according to other protocols to provide the desired information regarding Mip-map selection. For, example, the value of the SHIFT signal may be based upon the order of change from the previously selected Mip-map. Thus, if Mip-map #3 had been used for the last pixel, but Mip-map #5 was required for the next pixel, the select logic would generate a SHIFT output signal indicating a second order compression of the previous Mip-map size was required. Use of this protocol would require that the Mip-map select logic and texture engine store the previous Mip-map size to use in determining which Mip-map to use in rendering the current pixel. As yet another alternative, multiple output signals could be provided to specify the Mip-map selected directly (i.e., a MAP SELECT signal), together with the SHIFT signal. Proceeding in this fashion would of course require additional signal lines, but would eliminate the need to "remember" the Mip-map previously used, or the need to specify a base reference map. Other techniques and protocols for signaling the Mip-map selection will be apparent to one skilled in the art.

The values for the depth registers 270, 272, 274, 276, 278, 280 preferably are loaded during system initialization. If desired, the minimum and maximum depth (z) values also may be defined for a scene by the graphics application or user. The graphics application preferably defines depth values for each of the depth registers.

When generating basic parameters in the 3D engine, the interpolation engine 205 receives initial values and slope values for the basic parameters, such as x and y. Each new scan line in the display has an initial x, y, and w (indicating width of the scan), and a $\Delta x$, a $\Delta y$ and a $\Delta w$, indicating the incremental change in the x, y and width values for each scan. Similarly for the texture map, the interpolation engine 205 receives a u and a v value, together with a $\Delta u$ and a $\Delta v$, and a $\Delta 2u$ and a $\Delta 2v$. These values are necessary to define curves and contours of patterns in the x, y plane. When texture mapping in one direction, the pattern could be changing in both the x and y planes. Thus, as the image is rendered in the x, y plane, the texture map may require a curved surface in the u, v plane, which may have an orientation different than the orientation of the x, y plane. The u, v values, therefore, represent another set of parameters directed specifically to texture mapping.

For texture mapping, the incremental values, $\Delta u$, $\Delta v$, represent the rate of change of u and v for a particular scan. Incremental values $\Delta u$, $\Delta v$ are generated for both the main and orthogonal slopes. In addition, for perspective texture mapping, another set of register values are provided to represent the rate of change of the incremental values, or a second order rate of change for the u, v values. These values are represented as $\Delta u$ and $\Delta 2$ v. The second order rate of change values for u and v are generated for both the main and orthogonal slopes. All of these parameters must be generated for each texture that is scanned. Thus, the following exemplary values may be generated for perspective texture mapping:

TABLE IV

| ADDRESS | NAME | DESCRIPTION |
| --- | --- | --- |
| 0x4050 | v | Initial value for v |
| 0x4054 | u | Initial value for u |
| 0x4058 | $\Delta$V_MAIN | v texel value coordinate for the first order main slope value. |
| 0x405C | $\Delta$U_MAIN | u texel value coordinate for the first order main slope value. |
| 0x4060 | $\Delta$V_ORTHO | v texel value coordinate for the first order ortho slope value. |
| 0x4064 | $\Delta$U_ORTHO | u texel value coordinate for the first order ortho slope value. |
| 0x4068 | $\Delta$2V_MAIN | v texel value coordinate for the second order main slope value. |
| 0x406C | $\Delta$2U_MAIN | u texel value coordinate for the second order main slope value. |
| 0x4070 | $\Delta$2V_ORTHO | v texel value coordinate for the second order ortho slope value. |
| 0x4074 | $\Delta$2U_ORTHO | u texel value coordinate for the second order ortho slope value. |
| 0x4078 | $\Delta$V_ORTHO_ADD | v Texel coordinate first order Ortho slope value |
| 0x407C | $\Delta$U_ORTHO_ADD | u Texel coordinate first order Ortho slope value |

Referring again to FIG. 3, the texture engine 230 receives as an input the SHIFT signal from the Mip-map select logic 225, and also receives the pixel parameters (including values for x, y, z, r, g, b, u, v, a) from the interpolation engine 205. When Mip-maps are switched, some of the pixel parameters generated by the interpolation engine 205 must be modified to reflect the data compression or expansion that occurs. In particular, the u and v values must be modified to provide accurate texture mapping of the modified image. As one skilled in the art will understand, when performing perspective texture mapping, u and v values represent x and y values for a texture. When switching between Mip-maps, parameters must be changed to reflect the difference in size of the images. Prior art techniques required parameters to be regenerated for texture mapping. In the present embodiment, the u and v parameters are automatically adjusted based upon the SHIFT signal, thus eliminating hardware and processor cycles. Thus, the u and v values generated by the interpolation engine 205 represent texture values for a base reference texture map, such, as for example, Mip-map #1. The value of the SHIFT signal indicates the order of change from the base reference Mip-map. Thus, the present invention permits fast modification of texture values with simple shift operations.

As texture maps are switched with the Mip-maps, the prior art techniques required a re-computation of all of the u and v values, including the first and second order rate of change values. By using the depth value (z) in accordance with the principles of the present invention, the u and v values (and associated rate of change values) are computed once by the interpolation engine 205, and then shifted in the texture engine 230 based upon the Mip-map selected by the Mip-map select logic 225.

In addition to the depth registers, the graphics processor includes a set of base address registers 220, as shown in FIG. 3. The base address registers includes a base zero register that functions as the reference register for the texture engine 230. The base zero register has the base Mip-map values. Other base address register values also are provided in the base address register 220 corresponding to other Mip-maps. The address for the base address register values are used by the texture engine 230 to determine the base address of the texture map to be read. According to the principles of the preferred embodiment, the base address (BASE ADDRESS) for the texture map is found by taking the selected mip-map address (BASE×ADDRESS), plus v' times the shifted width value (w'), plus u'. Thus, according to the present invention, the selected texture map is found at the BASE ADDRESS, which is determined as follows:

$$\text{BASE ADDRESS} = \text{BASE} \times \text{ADDRESS} + (v'^* w') + u'$$

where the BASE×Address is the address of the mip-map identified by the SHIFT value.

The BASE ADDRESS identifies the address of the texture map to be read by the texture engine 230. In accordance with the preferred embodiment, the texture maps are generated and pre-loaded by the graphics application and stored in memory. Once initialized, the system enters an animation mode in which the graphics processor generates parameters. From these parameters, a BASE ADDRESS value is computed that is used to retrieve the appropriate texture map from memory.

According to the principles of the present invention, therefore, the SHIFT signal is used to modify the u and v values automatically, with a minimum number of clock cycles. In the preferred embodiment, the texture engine 230 generates the appropriate texture map based upon the SHIFT signal, using a particular Mip-map (such as Mip-map #1) as a base reference. Preferably, the largest Mip-map is used as the base reference mip-map to maximize the resolution of the other available Mip-maps. The texture engine 230 preferably shifts the u and v texture values based upon the value of the SHIFT signal to obtain a u', v' signal for use in texture mapping the selected Mip-map. Similarly, the texture width value (w) is modified by the SHIFT signal to provide a w' value for use in selecting the appropriate texture map. The texture map preferably is stored in either the display buffer or in system memory where it is read by the graphics processor based upon address specified by the modified values by the texture engine.

Figure 7:
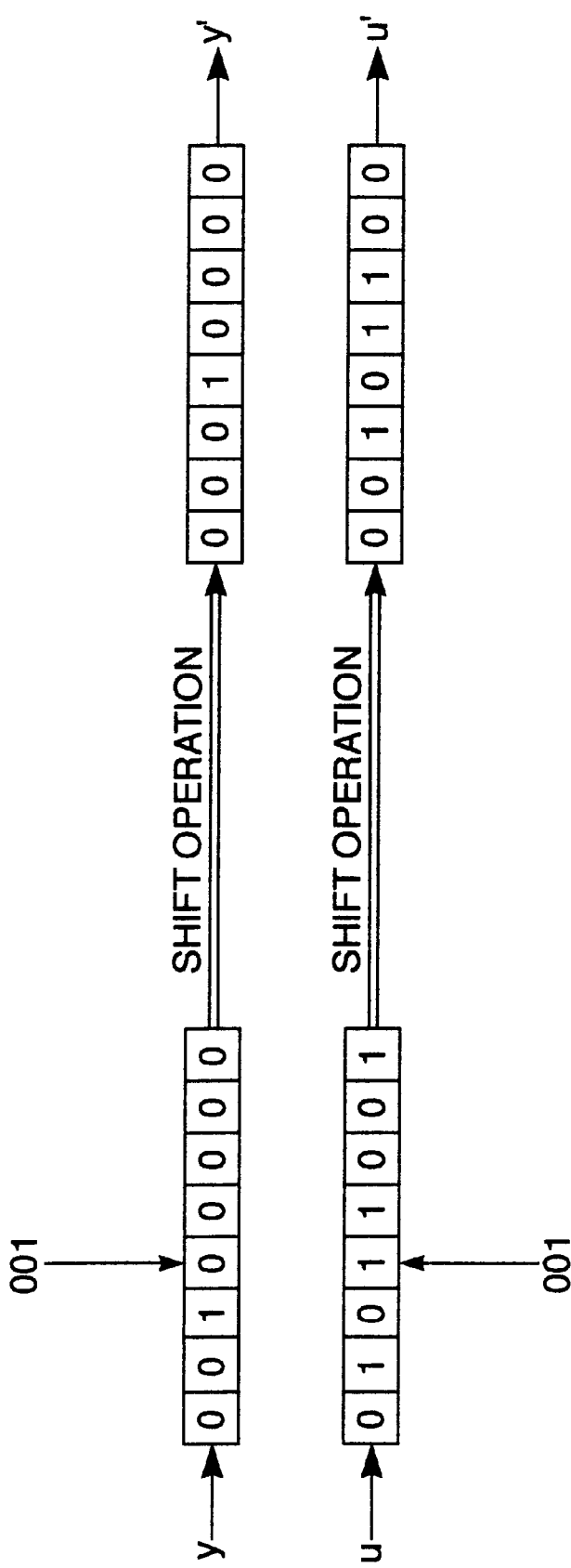
FIG. 7 is an exemplary illustration of a first order shift operation on the integer portions of the u and v values.

Thus, as shown in the exemplary illustration of FIG. 7, if the integer portion of the v value was 0010 0000, and the SHIFT signal was 001, indicating a first order shift from Mip-map #1, the v' value would become 0001 0000, which represents a shift (or divide by 2) of the base v value. Similarly, if the integer portion of the u value was 0101 1001, a first order shift would result in the value 0010 1100 for u' As will be understood by one skilled in the art, similar shifting also could occur in the fractional portion of the texture value, if desired. In this fashion, the texture values u and v related to the base reference Mip-map are automatically adjusted together with the Mip-map selection. In accordance with the preferred embodiment, the texture engine 230 reads the appropriate texture map by calculating an address with the modified u', v' values.

Referring still to FIG. 3, the texture map obtained by the texture engine 230 preferably provides data on the color values (r, g, b) required for rendering the pixel. These color values then are provided to the color logic 240, which performs color comparisons or other color computations and operations, as will be apparent to one skilled in the art. The Z buffering logic 260 then reads the Z buffer value, and the Z buffer value $Z_B$ is compared with the actual z value ($Z_S$) for the pixel to be rendered in comparator 265. If the z screen value ($Z_S$) is less than the Z buffer value ($Z_B$) (assuming that a smaller value indicates a closer depth than a larger value) the pixel is written to the display buffer.

Figure 5:
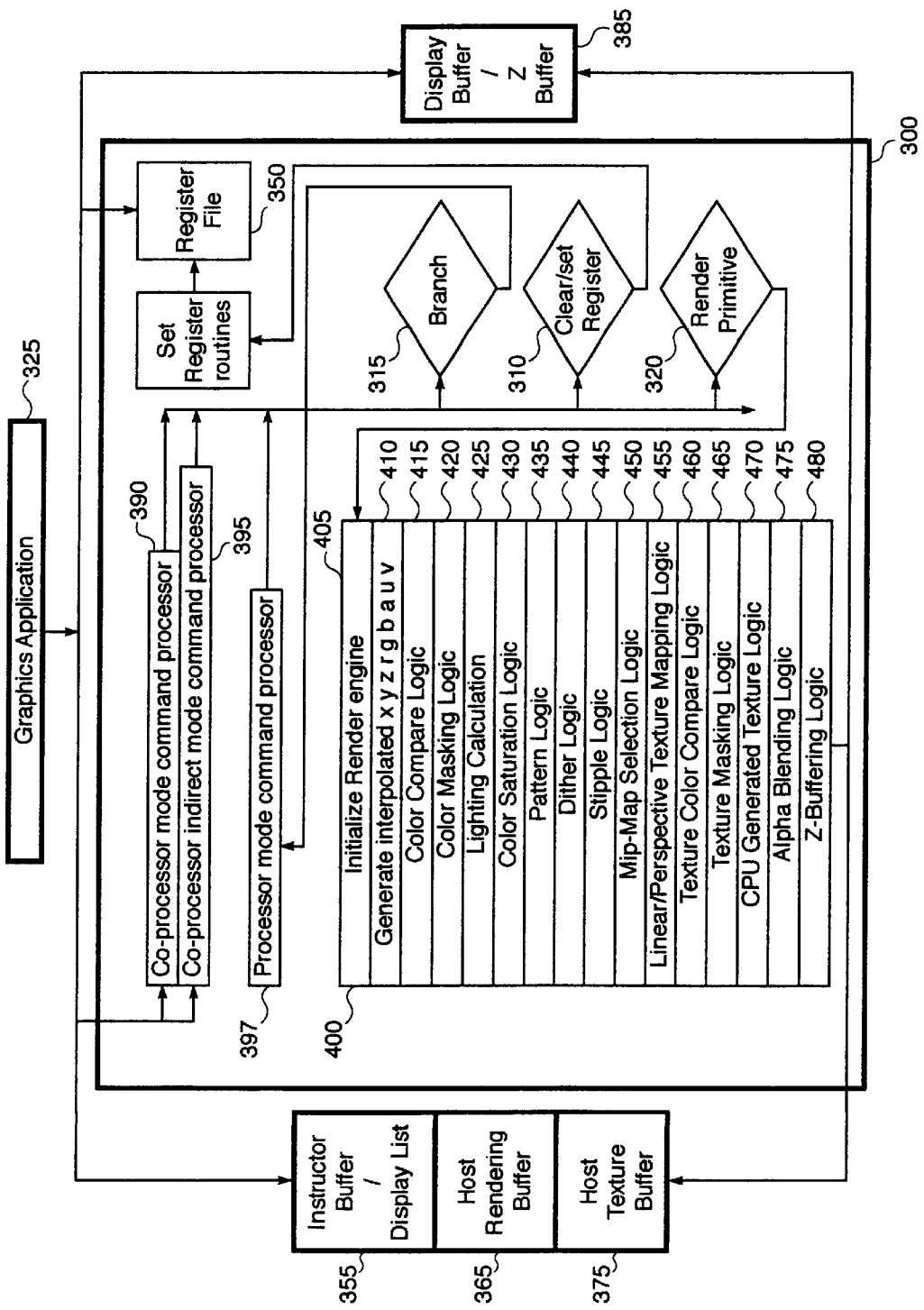
FIG. 5 is a block diagram depicting the modules comprising the software algorithm in an alternative embodiment.
Figure 6:
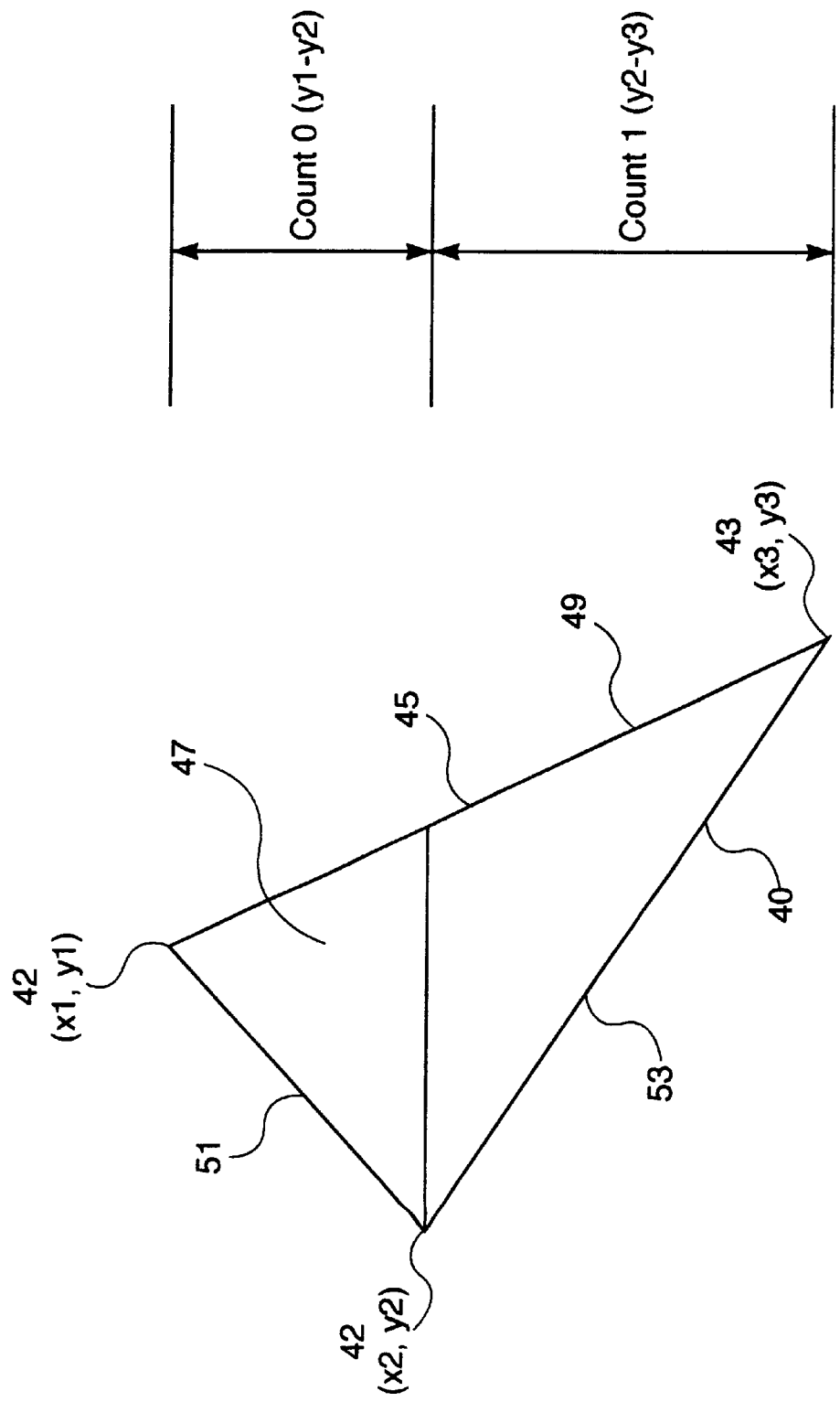
FIG. 6 is a depiction of a polygon to be drawn to illustrate the main slope technique for rendering 3D primitives.

As an alternative to the hardware implementation discussed above, the present invention also can be constructed as a software algorithm to be executed on the host processor or other system processor. Referring now to FIG. 5, a 3D software engine 300 is shown in conjunction with a graphics application 325, a display buffer/Z buffer 385, and host buffers 355, 365, 375. As will be understood by one skilled in the art, the 3D software engine 300 preferably is loaded in and executed by the host processor, with the generated pixel values loaded into the display buffer 385 or other memory device, or directly written to the display. The instruction buffer/display list 355 provides a list of parameters for the object to be drawn. These parameters are fetched by the 3D software during the primitive rendering routines, and used to generate values for the pixel to be drawn.

The software graphics engine therefore has different subroutines. Instead of loading parameter values in a register file, the parameters are provided as register file variables in the software. Thus, instead of loading and modifying u and v values in the texture engine, the software graphics engine calls a sub-routine to retrieve the u and v values, and returns back u', v' values. Thus, the software engine sends out pointers to u and v and returns back modified pointers to u' and v'.

As shown in FIG. 5, the 3D software engine 300 preferably includes one or more software modules 390, 395 for entering a co-processor mode. If not in a co-processor mode, the 3D software engine remains in a processor mode 397 in which the software engine has command of the processor.

Based upon the instructions from the host, and as shown in decisional blocks 310, 315, 320, the 3D software engine either clears or sets the register file (decisional block 310), branches to a particular address (decisional block 315), or begins to render the primitive (decisional block 310) identified in the register file 350. The register file 350 receives the display list from instruction buffer 355 for each polygon to be drawn and associates the display list values with software variables.

If the primitive is to be rendered, the software engine proceeds to the routines depicted in block 400. The first step in rendering the polygon, identified as routine 405, is to initialize the render engine. Next, interpolated values are generated by routine 410 for x (x coordinate), y (y coordinate), z (z coordinate or depth), r (red), g (green), b (blue), a (alpha), u (texture), and v (texture). The functions performed by routines 405, 410 correspond to the operation of the interpolation engine 205 of FIG. 3.

Referring still to FIGS. 3 and 5, the linear/perspective texture map logic 455, texture color compare logic 460, texture masking logic 465, and CPU generated texture logic 470 correspond to the operations performed by mip-map select logic 225 and texture engine 230. The routines associated with Mip-map selection will be discussed in more detail below. Similarly, routines 415, 420, 425, 430, 435, 440, 445 correspond to the operations performed by color logic 240. The functional operations include color comparisons, color masking, lighting, color saturation, pattern, dither, and stipple logic. Preferably, the color operations are performed after the Mip-map is selected. The Z buffering logic 480 corresponds to the operations performed by Z buffering logic 260 and Z comparator 265.

The Mip-map selection routine now will be described. As described above in relation to FIGS. 3 and 4, the Mip-map select logic 225 compares the z value to depth register values to select the value of the SHIFT output signal. In similar fashion, the 3D software engine determines a SHIFT value based upon a comparison of depth (z), and the values in depth registers (such as, for example, $DR_0$, $DR_1$, $DR_2$, $DR_3$, $DR_4$, $DR_5$, and $DR_6$).

The software determines the BASE ADDRESS value using the shift variable. The shift variable is determined based upon a comparison of the depth value of the pixel (z) with the depth registers ($DR_x$), as follows:

An exemplary code excerpt follows:

```
select_mip-map (u, v, z)
    If(z < DR0)
        shift = 0
        else if (z < DR1)
            shift = 1
            else if (z < DR2)
                shift = 2
                else if (z < DR3)
                    shift = 3
                    else if (z < DR4)
                        shift = 4
                        else if (z < DR5)
                            shift = 5
                            else if (z < DR6)
                                shift = 6
    return shift;
```

Similarly, the 3D software engine performs texture mapping operations in accordance with the discussion relating to texture engine 230. The software engine includes a routine to read text memory based upon the shift returned and the values of u and v. In the preferred embodiment, this routine is referred to as "out phase logic" to refer to the retrieval of the variables required to render the pixel, including x,y,z,r, g,b,u,v,a. The software engine looks to determine if texture mapping is required as part of the graphics application instruction, which may be determined by checking the status of a dedicated bit. If texture mapping is provided as part of the instructions from the graphics application, the software engine reads a texture map from memory based upon the u, v values (and sets shift equal to 0).

If mip-mapping is implicated in the instructions from the graphics application, then the software engine looks at the shift variable and selects the mip-map based upon that value. In addition, the shift variable is examined when reading the texture map based upon the u, v values.

An exemplary code excerpt for implementing the software engine would be:

```
out_phase_logic (x, y, z, r, g, b, u, v, a)
    If (instr & tex_mapping)
        read_tex_memory (u, v)
        shift = 0
    If (instr & tex_mapping)
        If (instr & mip-mapping)
            shift = select_mip-map (z);
            read_tex_memory (u, v, shift)
```

The software engine reads text memory based upon the shifted u, v values if shift does not equal zero, and mip-mapping is implemented. If shift equals zero, the base value is set equal to base 0. If shift equals 1, then case 1 is implemented and base is set equal to base 1. Similarly, if shift equals 2, then case 2 is implemented and base is set equal to base 2. This procedure continues for every possible mip-map provided. After the base value is calculated, then the u and v values are shifted based upon the value of shift. Similarly, the texture width value is shifted right based upon the value of shift. The texture map address is found by taking the base value calculated and adding v times the texture width, plus the u value. Finally, the pixel value is determined by reading the texture map in memory. An exemplary code excerpt follows:

```
read_tex_memory (u, v, shift)
    base = base 0
    If (shift)
        switch (shift)
            case 1
                base = base 1
            break
            default
                print (error in shift value)
    u = u >> shift
    v + v >> shift
    tex_width_a = tex_width >> shift
    tex_addr = base + (v * tex_width_a) + u
    pix_valu = read_memory (tex_addr)
```

A detailed copy of the code used in the preferred embodiment is attached as an Appendix.

Numerous variations and modifications will become apparent to those skilled in the art once the above disclosure is fully appreciated. It is intended that the following claims be interpreted to embrace all such variations and modifications.

APPENDIX

```
/******************************************************************/
void render_poly_3d()
{
    int count, j;
    int width_count;
    int scan_line;
    int top_count, end_count, flat_bot_test;
    flush_3d_register_file();
    set_poly_engine();
```

APPENDIX-continued

```
set_texture_engine();
if (dynamic_mip_map_z_enabled)
    set_d_registers_for_mip_maps ();
count = poly.main_count + 1;
top_count = count;
flat_bot_test = poly.opp_count;
for (j=0; j<2; j++)
{
    for(;count >0; count--)
    {
        width_count = poly.width_main >> 16;
        do_width_adjustment ();
        width_count & = 0xfff;
        width_count = (width_count & 0x00000800)? 0 : width_count;
        end_count = width_count;
        for (;width_count>=0;width_count--)
        {
            /* set current positions and colors */
            x_pos = poly.ymain >> 16;
            y_pos = poly.ymain >> 16;
            x_pos = (x_pos & 0x800)? 0 : x_pos;
            y_pos = (y_pos & 0x800)? 0 : y_pos;
            if (z_stride_control || (pixel_mode == PIXEL_MODE_24BPP_8BZ))
                z_pe = z_accum.cur >> 24;
            else
                z_pe = z_accum.cur >> 16;
            a_pe = (alpha_accum.cur >> 8) & 0xff00;
            r_pe = (red_accum.cur >> 8) & 0xff00;
            g_pe = (green_accum.cur >> 8) & 0xff80;
            b_pe = (blue_accum.cur >> 8) & 0xff00;
            if (texture_mode)
                switch (texture_mode)
                {
                    case TEXTURE_LINEAR:
                        v_pos = tex_lin.vout;
                        u_pos = tex_lin.uout;
                        break;
                    case TEXTURE_PERSPECTIVE:
                        v_pos = tex_persp.vout;
                        u_pos = tex_persp.uout;
                        break,
                    default:
                        warning ("Invalid texture mode\n");
                }
            if (dynamic_mip_map_z_enabled)
            {
                shift = set_uv_shift_and_hxyoffset0 ();
                v_pos >> = shift;
                u_pos >> = shift;
            }
            out_phase_logic ();
            /* Adjust x along the scan line */
            if (x_dir)
                poly.xcur = 0x10000;
            else
                poly.xcur += 0x10000;
            /* Adjust red accumulator for next pixel */
            red_accum.cur += red_accum.x_incr;
            if (red_accum.cur & 0x01000000)
                if (red_accum.cur & 0x02000000)
                    red_accum.cur = 0;
                else
                    red_accum.cur = 0x00ff0000;
            /* Adjust green accumufatdr for next pixef */
            green_accum.cur += green_accum.x_incr;
            if (green_accum.cur & 0x01000000)
                if (green_accum.cur & 0x02000000)
                    green_accum.cur = 0;
                else
                    green_accum.cur = 0x00ff0000;
            /* Adjust blue accumulator for next pixel */
            blue_accum.cur += blue_accum.xincr;
            if (blue_accum.cur & 0x01000000)
                if (blue_accum.cur & 0x02000000)
                    blue_accum.cur = 0;
                else
                    blue_accum.cur = 0x00ff0000;
            /* Adjust alpha accumulator for next pixel */
            alpha_accum.cur += alpha_accum.x_incr;
```

APPENDIX-continued

```
if (alpha_accum.cur & 0x01000000)
    if (alpha_accum.cur & 0x02000000)
        alpha_accum.cur = 0;
    else
        alpha_accum.cur = 0x00ff0000;
/* Adjust z accumulator for next pixef */
z_accum.cur += z_accum.x_incr;
z_accum.d_cur += (double) z_accum.x_incr;
if (z_accum.d_cur <0.0)
{
    z_accum.cur = 0;
    z_accum.d_cur = 0.0;
}
else if (z_accum.d_cur > (double)(unsigned)0xffff0000)
{
    z_accum.cur = 0xffff0000;
    z_accum.d_cur = (double)(unsigned)0xffff0000;
}
if (texture_mode)
    switch (texture_mode)
    {
        case TEXTURE_LINEAR:
        finear_texture_accumufate_in_x_();
        break;
        case TEXTURE_PERSPECTIVE:
        perspective_texture_accumulate_in_x ();
        break;
        default:
        warning ("Invalid texture mode\n");
    }
}
/* Adjust positional accumulators for next scan line */
pofy.xmain += poly.defta_x;
pofy.xcur = poly.xmain;
poly.ymain += poly.delta_y;
/* Adjust width accumulator for next scan line */
if (j)
    poly.width_main += poly.width_inc_opp;
else
poly.width_main += poly.width_incr_main;
/* Adjust red accumulator for next scan line */
red_accum.main +=_red_accum.y_incr;
if (red_accum.main & 0x01000000)
    if (red_accum.main & 0x02000000)
        red_accum.main = 0;
    else
        red_accum.main = 0x00ff0000;
red_accum.cur = red_accum.main;
/* Adjust green accumulator for next scan line */
green_accum.main += green_accum.y_incr;
if (green_accum.main & 0x01000000)
    if (green_accum.main & 0x02000000)
        green_accum.main = 0;
    else
        green_accum.main = 0x00ff0000;
green_accum.cur = green_accum.main;
/* Adjust blue accumulator for next scan line */
blue_accum.main += blue_accum.y_incr;
if (blue_accum.main & 0x01000000)
    if (blue_accum.main & 0x02000000)
        blue_accum.main = 0;
    else
        blue_accum.main = 0x00ff0000;
blue_accum.cur = blue_accum.main;
/* Adjust alpha accumulator for next scan line */
alpha_accum.main += alpha_accum.y_incr;
if (alpha_accum.main & 0x01000000)
    if (alpha_accum.main & 0x02000000)
        alpha_accum.main = 0;
    else
        alpha_accum.main = 0x00ff0000;
alpha_accum.cur = alpha_accum.main;
/* Adjust z accumulator for next scan line */
z_accum.main += z_accum.y_incr;
z_accum.d_main += (double) z_accum.y_incr;
if (z_accum.d_main <0.0)
{
    z_accum.main = 0;
    z_accum.d_main = 0.0;
```

APPENDIX-continued

```
            }
            else if (z_accum.d_main >(double)(unsigned)0xffff0000)
            {
                z_accum.main = 0xffff0000;
                z_accum.d_main = (double)(unsigned)0xffff0000;
            }
            z_accum.cur = z_accum.main;
            z_accum.d_cur = (double) z_accum.main;
            if (texture_mode)
                switch (texture_mode)
                {
                    case TEXTURE_LINEAR:
                    linear_texture_accumulate_in_y ();
                    break;
                    case TEXTURE_PERSPECTIVE:
                    perspective_texture_accumulate_in_y ();
                    break;
                    default:
                    warning ("Invalid texture mode\n");
                }
            }
        if (warp_mode)
                poly.width_main = poly.width_opp;
                count = poly.opp_count;
    }
}
/*****************************************************************************/
int set_uv_shift_and_hxy_offset0 ()
{
    if (z_pe < d0)
    {
        set_hxy_offset0 (d0);
        return 0;
    }
    else if (z_pe < d1)
    {
        set_hxy_offset0 (d1);
        return 1;
    }
    else if(z_pe < d2)
    {
        set_hxy_offset0 (d2);
        return 2;
    }
    else if (z_pe < d3)
    {
        set_hxy_offset0 (d3);
        return 3;
    }
    else if (z_pe < d4)
    {
        set_hxy_offset0 (d4);
        return 4;
    }
}
```

What is claimed is:

1. A method for selecting a mip-map for pixel rendering, comprising:

generating a display list of parameter values that define an object;

storing said display list values in a register file;

receiving parameter values from said register file;

generating pixel values using said parameter values for each pixel, wherein one of the pixel values generated is a depth value;

comparing each of said depth values to predetermined depth values; and selecting a mip-map having a specific size based upon the results of said comparison.

2. A method as in claim 1, wherein selecting a mip-map includes determining a shift value.

3. A method as in claim 2, wherein determining a shift value substantially implements a depth-related algorithm.

4. A method as in claim 2, further comprising reading a texture map based upon the mip-map selected.

5. A method as in claim 4, wherein reading the texture map is implemented using the selected mip-map and a texture width valve.

6. A method as in claim 4, wherein reading the texture map is based at least in part upon the value of texture parameters provided by generating pixel values.

7. A method as in claim 6, wherein the texture value parameters are modified based upon the shift value.

8. A method as in claim 7, wherein the texture value parameters are shifted a number of bits defined by the value of the shift value.

9. A method as in claim 8, wherein reading the texture map includes assigning a base address corresponding to the mip-map selected.

10. A method as in claim 8, wherein the step of reading the texture map includes the step of calculating a base address for the texture map based upon the base address and the modified texture value parameters.

11. A graphics subsystem as in claim 1, further comprising the step of loading the predetermined depth values in a plurality of depth registers.

12. A method of processing graphics, comprising:

storing a display list of parameter values;

defining a plurality of depth values;

generating pixel values for each pixel based upon the display list of parameter values, said pixel values including a pixel value indicative of depth;

receiving the pixel value indicative of depth;

comparing each of said pixel values indicative of depth with the plurality of depth values; and selecting a mip-map having a specific size based upon results of the comparison.

13. A method as in claim 12, further comprising generating an output signal indicative of the mip-map selected.

14. A method as in claim 13, further comprising the step of receiving texture parameters as part of the parameter values;

receiving the output signal from said mip-map select logic, and modifying the texture parameters based upon the output signal from said mip-map select logic.

15. A method as in claim 14, further comprising reading a texture map from memory based in part upon the modified texture parameter values.

16. A method as in claim 15, wherein reading the texture map also is based in part on a base address value defined by the mip-map selected.

17. A computer readable storage medium for storing an executable set of software instructions which, when inserted into a host computer system, are capable of controlling the operation of the host computer, said software instructions including:

means for retrieving display list values defining an object to be drawn;

means for generating interpolated pixel parameter values from said display list values for each pixel, including a depth value for each pixel; and mip-map selection logic coupled to said generating means for receiving the depth value for each pixel, said mip-map select logic comparing each of the depth values with depth values associated with each of a plurality of depth registers, and determining a shift value based upon the results of said comparison.

18. A medium as in claim 17, wherein the pixel parameter values include texture parameters.

19. A medium as in claim 18, further comprising texture logic receiving the texture parameters and the shift value, and wherein the texture logic modifies the texture parameters based upon the shift value.

20. A medium as in claim 19, wherein the texture parameters are shifted by a number of bits defined by the shift value.

21. A medium as in claim 20, wherein the shifted texture parameters are used to define an address for reading a texture map.

22. A medium as in claim 21, wherein the address of the texture map also is based upon the address of the mip-map selected.

* * * * *